(12) United States Patent
Pfetzer

(10) Patent No.: US 6,644,352 B1
(45) Date of Patent: Nov. 11, 2003

(54) VALVE

(75) Inventor: Johannes Pfetzer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/600,467

(22) PCT Filed: Jul. 30, 1999

(86) PCT No.: PCT/DE99/02342

§ 371 (c)(1),
(2), (4) Date: Jul. 17, 2000

(87) PCT Pub. No.: WO00/31446

PCT Pub. Date: Jun. 2, 2000

(30) Foreign Application Priority Data

Nov. 25, 1998 (DE) .......................... 198 54 308

(51) Int. Cl.⁷ ............................................ F16K 11/078
(52) U.S. Cl. .................................. 137/875; 137/625.44
(58) Field of Search ........................... 137/875, 625.44

(56) References Cited

U.S. PATENT DOCUMENTS

| | | | | |
|---|---|---|---|---|
| 925,053 A | * | 6/1909 | Sturgis ...................... | 137/875 |
| 2,605,076 A | * | 7/1952 | Tanke ......................... | 137/875 |
| 2,912,012 A | * | 11/1959 | Klingler et al. ........ | 137/625.44 |
| 3,773,062 A | * | 11/1973 | McIver ...................... | 137/875 |
| 4,241,760 A | | 12/1980 | Mon | |
| 4,312,378 A | | 1/1982 | Dollison | |
| 4,450,867 A | | 5/1984 | Moore | |

FOREIGN PATENT DOCUMENTS

| | | | |
|---|---|---|---|
| DE | 22 63 255 A | | 6/1974 |
| DE | 85 25 184 U | | 10/1985 |
| EP | 0 819 875 | * | 7/1997 |
| NL | 7 216 654 A | | 3/1973 |

* cited by examiner

Primary Examiner—John Fox
(74) Attorney, Agent, or Firm—Michael J. Striker

(57) ABSTRACT

The invention relates to a valve, in particular for the fluid circulation in a motor vehicle, having a housing (12) with at least one inlet (14) and at least one outlet (16, 18) that communicate with one another via a passage (20), and having a valve member (22), which is embodied as a movable flap (24) that monitors the passage (22), wherein the passage (20) has a chamber (26) in which the flap (24) is disposed and into which the at least one inlet (14) and the at least one outlet (16, 18) discharge, wherein the flap (24) is pivotably supported in the housing (12) and can be shifted via a drive mechanism (36, 70) from a first terminal position (38) to a second terminal position (40), and wherein the terminal positions (38, 40) form an angle ($\alpha$) that is smaller than 90°.

2 Claims, 2 Drawing Sheets

VALVE

BACKGROUND OF THE INVENTION

The invention relates to a valve, in particular for the fluid circulation in a motor vehicle[, as generically defined by the preamble to the main claim]. Such valves are used to block fluid flows or throttle them or distribute them. To that end, such a valve has at least one inlet, one outlet, and a valve member that monitors the passage between the inlet and the outlet. The valve member is embodied as flap, which can move in the passage and varies or closes the flow cross section. Great effort must be expended to put the flap securely into the application determined position.

SUMMARY OF THE INVENTION

In accordance with the invention, a valve is proposed which has a valve for a fluid circulation in a motor vehicle, comprising a housing having at least one inlet and at least one outlet that communicate with one another via a passage; a valve member formed as a movable flap that monitors said passage, said passage having a chamber in which said flap is disposed and into which said at least one inlet and said at least one outlet discharge, said flap being pivotably supported in said housing; a drive mechanism which shifts said flap from a first terminal position to a second terminal position, wherein said terminal positions form an angle a that is smaller than 90°.

The valve of the invention has the advantage that the flap has to be swiveled over n o more than a small range, so that the expense for both driving it and sealing are reduced considerably. The valve can also be designed to be smaller and more compact, since the chamber receiving the flap can also be kept smaller. Since the terminal positions of the flap as a rule correspond to the position of the outlet openings, a streamlined passage is created, reducing the flow resistance.

An even further improved flow passage is obtained if the terminal positions form an angle α of less than 60° and preferably less than 45°. It is also advantageous if, in this valve that has two outlets, the outlets form a second angle β to one another that is again less than 90° and preferably equal to the angle α formed by the terminal positions of the flap. In this way, a very compact, slender valve is created, which is distinguished by low flow resistance, because the deflections are few and slight.

If the cross section of the mouth of the inlet into the chamber receiving the flap is smaller than the chamber, thus producing an edge surrounding the mouth region, edge eddies develop that have the effect that the flows press against the chamber wall and thus further reduce the flow resistance. It is helpful if the cross section of the inlet tapers in the direction of the chamber and in particular assumes a rectangular shape. With this kind of embodiment, an optimal flow passage is achieved. It is equally advantageous if the outlet discharge opening toward the chamber is also rectangular, especially since whenever the flap cooperates with this mouth, the largest possible flow cross section can be established. Preferably, the housing is in two parts and has a base part and a cap part, and the base part receives the flap bearing, and the at least one outlet is formed onto the base part and the at least one inlet is formed onto the cap part. This design is economical and easy to assemble, because only a few individual parts are needed. The cap part can be simply placed on the base part and locked there. Special fastening means are not needed.

If the flap is supported in the chamber in a region opposite the inlet mouth, and if in particular the flap extends from the bearing to the inlet mouth and tapers to a point on its end opposite the bearing, the force required to move the flap can be kept small, because on the one hand hardly any dynamic flow pressure has to be overcome to move the flap out of a terminal position, and on the other because the flap extends directly in the flow direction and therefore hardly presents any resistance to the flow, and beginning at a middle position, the flow itself reinforces the flap motion.

With an elastomer sheath surrounding the flap, on the one hand a simple sealing of the outlet discharge opening can be attained, and on the other, the region of the bearing of the flap can simultaneously be sealed off from the housing. It is advantageous if the chamber has conical faces, which cause a tapering of the chamber in the direction of the bearing. Upon insertion of the flap, the elastomer sheath rests on the conical faces, and as the flap is inserted, the elastomer sheath is compressed in the direction of the bearing region to the pressure required for the sealing.

The flap is preferably urged by an elastic means into a preferential position, such as the middle position, so that if the drive mechanism fails, a defined state can be established automatically. The elastic means is likewise advantageously formed by the elastomer sheath, which engages a recess in a chamber wall.

The flap bearing which has a shaft passing through the housing wall, is preferably also embraced outside the housing by a sealing element, which in turn is secured to the housing. The sealing element provided for this purpose has a shaft seal on the one hand, and on the other a seal similar to an O-ring seal in the outer region, as well as a sealing cap surrounding the end of the shaft. Both the shaft seal and the sal similar to the O-ring seal are structurally connected to the housing and prevent the fluid from creeping out. The drive mechanism engages the sealing cap, which also acts as a sealing means and surrounds the shaft end, from the outside and acts on the shaft end, which is for instance square. This region of the seal thus moves together with the shaft end and can accordingly be completely closed. This creates an absolutely reliable seal. This type of seal becomes possible because the angle a between the terminal positions of the flap motion is designed to be less than 90°, and preferably less than 60° or 45°.

BRIEF DESCRIPTION OF THE DRAWINGS

An exemplary embodiment of the valve of the invention is shown in the drawing and described in further detail below.

DESCRIPTION OF THE PREFERRED EMBODIMENT

Figure 1:
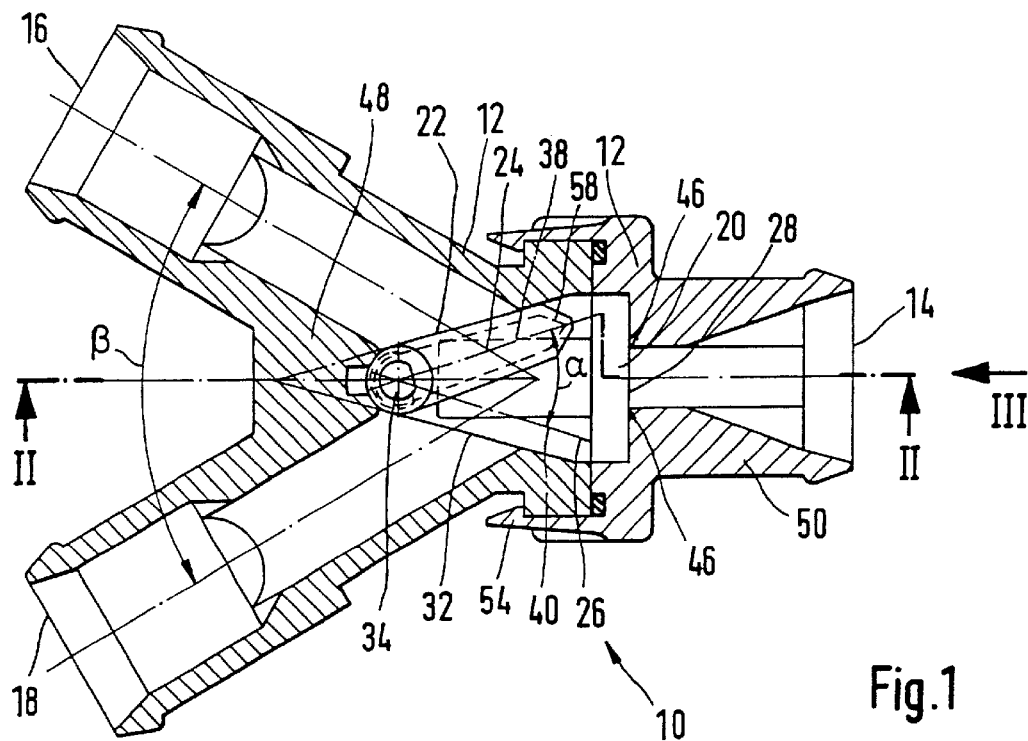
FIG. 1 shows a valve of the invention in a plan view, in a section taken along the line I—I of FIG. 2.

The valve 10 shown in FIG. 1 has a housing 12 with an inlet 14, a first outlet 16, and a second outlet 18; the outlets 16, 18 communicate with the inlet 14 via a passage 20. A valve member 22 is disposed in the passage 20; it is embodied as a movable flap 24 and it monitors the passage 20.

Figure 2:
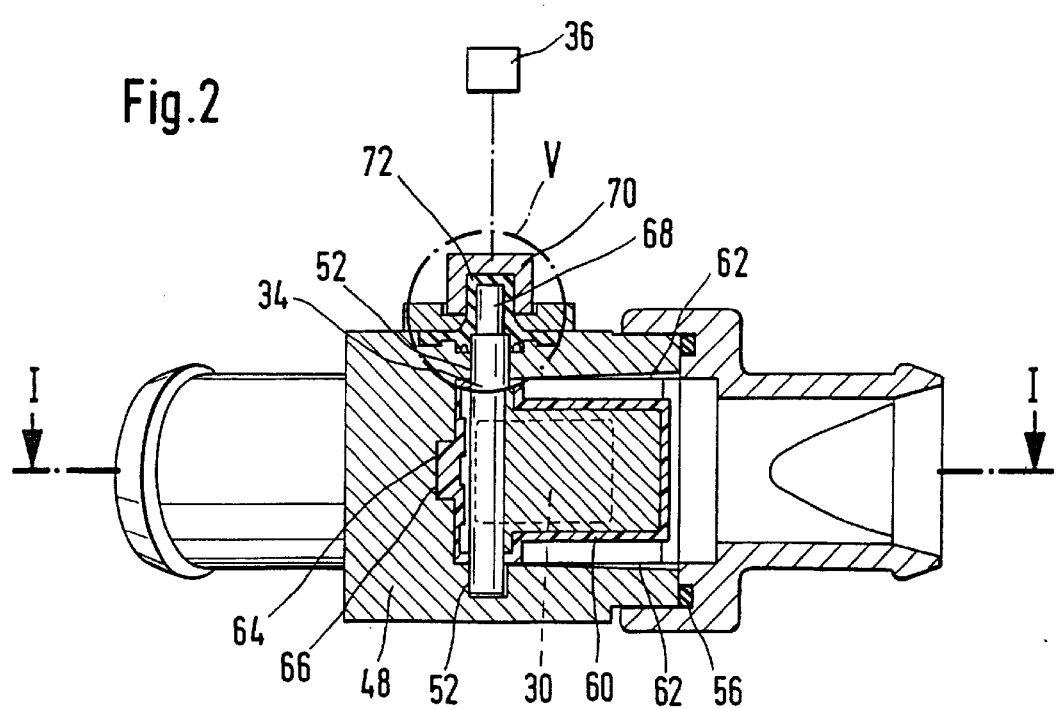
FIG. 2 shows a section along the line II–II of FIG. 1.

In the region of the flap 24, the passage 20 has a chamber 26, into which the inlet 14 discharges with an inlet discharge opening 28, the first outlet 16 discharges with an outlet discharge opening 30 (FIG. 2), and the second outlet 18 discharges with an outlet discharge opening 32. The flap 24 is rotatably supported in the housing 12 via a shaft 34 and can be shifted via a drive mechanism 36 from a first terminal position 38 to a second terminal position 40. The terminal positions 38 and 40, in this exemplary embodiment, form an angle α of 35°.

The two outlets 16, 18 form a second angle β with one another, which is on the order of magnitude of the angle α and is thus approximately 35°. The two outlets 16 and 18 are disposed symmetrically to the chamber 26 and form a Y shape, in the plan view of FIG. 1, with the inlet 14. With this shape, favorable flow conditions from the inlet 14 into both outlets 16 and 18 are achieved.

Figure 3:
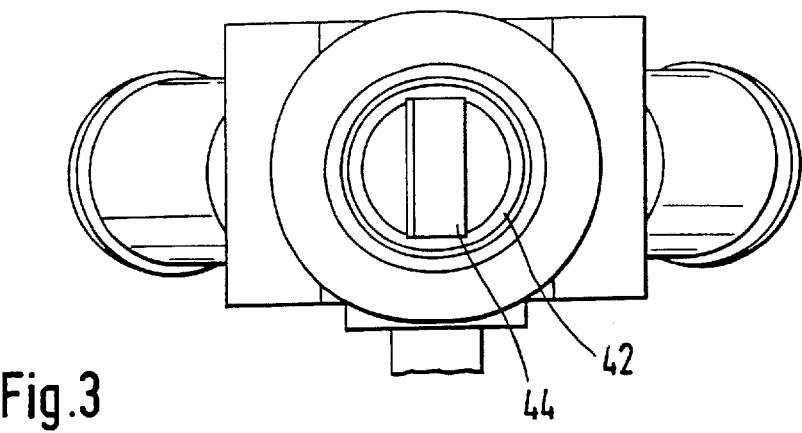
FIG. 3 is a view in the direction of the arrow III in FIG. 1.
Figure 4:
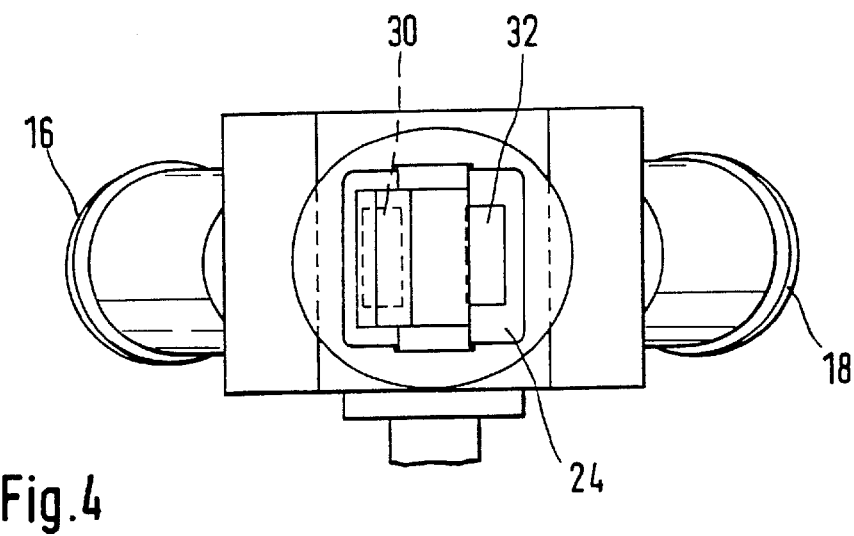
FIG. 4 is a view similar to FIG. 3 with the cap part removed.

The cross section of the inlet 14 tapers, beginning at a circular form 42 (FIG. 3) into a rectangular cross section 44. Because of the larger-cross section chamber 26 in the region of the inlet discharge opening 28, edges 46 form, which cause eddies in the inflowing fluid, which in turn assure that the flow will press against the chamber wall. This reduces the flow resistance. The outlet discharge openings 30 and 32 are likewise rectangular and change over to a round cross section.

The housing 12 is embodied in two parts and has a base part 48 and a cap part 50. The largest part of the chamber 26, as well as the bearing recesses 52 required for the shaft that receives the flap, are embodied in the base part 48. The two outlets 16 and 18 are also formed onto the base part 48. The inlet 14 is formed onto the cap part 50. The cap part 50 also forms part of the chamber 26. The cap part 50 is locked to the base part 48 by means of hooks 54 and is sealed off via an O-ring seal 56.

The bearing recesses 52 that receive the shaft 34 are introduced in the region of the outlet discharge openings 30 and 32, opposite the inlet discharge opening 28 in the base part 48. The flap 24 thus extends from the bearing of the shaft 34 in the direction of the inlet discharge opening 28. The chamber 26 accordingly tapers to a point, from the region of the inlet discharge opening 30 to the region of the shaft 34; the angle of this pointed tip in conjunction with the flap cross section defines the two terminal positions 38 and 40. The flap 24 has a pointed tip 58 on its end opposite the shaft 34.

The flap 24 has an elastomer sheath 60, which completely surrounds the flap as far as the bearing region of the flap. In the assembly of the valve 10, the flap 24 is introduced into the chamber 26 with the cap part 50 removed. To that end, the chamber 26 has conical faces 62, which taper in the direction of the bearing recesses 52. In the outer region, the elastomer sheath rests directly on the conical faces 62, and as the flap is inserted, it is compressed to an amount required for sealing and thus seals off the chamber 24 from the housing 12.

The elastomer sheath 60, with a continuation 64, engages a recess 66 in the base part 48. The flap 24 is thus held in a middle position in the direction of the inlet 14 and from there must be rotated in the direction of the terminal positions 38 or 40 counter to the spring force generated by the elastomer sheath. In the middle position, split fluid flows of equal size are distributed from the inlet 14 to the two outlets 16 and 18.

The flap 24 is driven via the shaft 34, which is supported in two bearing recesses 52; one bearing recess 52 acts as a passage opening through the base part 48, through which the shaft 34 passes with an end 68 that has a square. The end 68 is surrounded by positive engagement by a receptacle device 70 of the drive mechanism 36.

Figure 5:
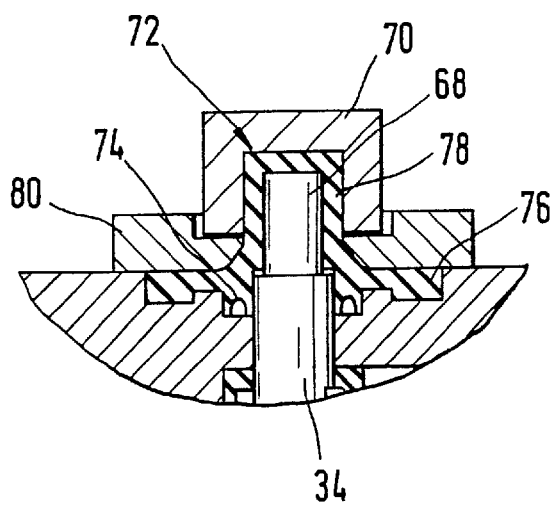
FIG. 5 is an enlarged view of the detail marked V in FIG. 2.

As a further seal in this region, a sealing element 72 is provided (FIG. 5), which embraces the shaft 34. The sealing element 72 has three portions, of which the first portion is embodied as a shaft seal 74, the second portion is embodied as a ring seal 76 that is similar to an O-ring seal, and a third region, in the form of a cap 78, completely surrounds the shaft end 68.

The cap 78 extends between the receptacle device 70 and the shaft end 68 and also acts as a damping means. The ring seal 74 is pressed into corresponding recesses in the base part 48 by a fastening element 80.

If the flap 24 pivots, the cap 78 with the square is rotated as well, while the shaft seal 74 and the ring seal 76 are both retained in stationary fashion in the base part.

The valve 10 of the invention can be used in such a way that one outlet 16, 18 at a time is completely opened, while the other outlet 18, 16 is blocked by the flap 24. This use would correspond to a two-point control. However, if a suitable drive mechanism 26 is used, it is also possible, via intermediate positions of the flap 24 between the two terminal positions 38, 40, to distribute split streams to the outlets 16, 18. This is possible because of the special disposition and shape of the flap and is promoted by the embodiment of both the chamber 26 and the region around the inlet discharge opening having the edges 46. Since eddies which cause the fluid flow to press against the chamber walls are created, it is possible to split the fluid flows without major flow losses. The valve 10 can also be used as a simple on/off valve, if one outlet is closed or entirely omitted. Because of the prestressing of the flap in the direction of a middle position, which can be assumed if the drive mechanism fails, for instance, by decoupling the drive mechanism from the shaft 34, an emergency function is achieved.

It is also conceivable to replace the drive from outside with a magnetic drive mechanism, which acts from outside on the flap 24.

What is claimed is:

1. A valve for a fluid circulation in a motor vehicle, comprising a housing having at least one inlet and at least one outlet that communicate with one another via a passage; a valve member formed as a movable flap that monitors said passage, said passage having a chamber in which said flap is disposed and into which said at least one inlet and said at least one outlet discharge, said flap being pivotably supported in said housing; a drive mechanism which shifts said flap from a first terminal position to a second terminal position, wherein said terminal positions form an angle α that is smaller than 90°, said housing being composed of two parts including a base part and a cap part; a flap bearing which is received in said base part, said at least one outlet being formed in said base part, while said at least one inlet being formed in said cap part, and elastic means prestressing said flap in direction of a predetermined position, said chamber having a chamber wall with a recess, said elastic means being formed by a continuation of an elastomer sheath engaging in said recess of said chamber wall.

2. A valve for a fluid circulation in a motor vehicle, comprising a housing having at least one inlet and at least one outlet that communicate with one another via a passage; a valve member formed as a movable flap that monitors said passage, said passage having a chamber in which said flap is disposed and into which said at least one inlet and said at least one outlet discharge, said flap being pivotably supported in said housing; a drive mechanism which shifts said flap from a first terminal position to a second terminal position, wherein said terminal positions form an angle $\alpha$ that is smaller than 90°, said housing being composed of two parts including a base part and a cap part; a flap bearing which is received in said base part, said at least one outlet being formed in said base part, while said at least one inlet being formed in said cap part, said housing having a housing wall, said flap having a flap bearing with a shaft which passes through said housing wall and is connected with said drive mechanism; and a sealing element which embraces said shaft outside said housing and is secured to said housing, said sealing element including a shaft seal, a ring seal, and a seal formed as a cap that surrounds an end of said shaft.

* * * * *